United States Patent Office 3,520,365
Patented July 14, 1970

3,520,365
STABILITY OF A SECONDARY-TYPE
RECOVERY PROCESS
Stanley C. Jones, Littleton, Colo., assignor to Marathon Oil Company, Findlay, Ohio, a corporation of Ohio
No Drawing. Continuation-in-part of application Ser. No. 693,129, Dec. 26, 1967. This application July 28, 1969, Ser. No. 845,561
Int. Cl. E21b 43/22
U.S. Cl. 166—273          10 Claims

ABSTRACT OF THE DISCLOSURE

A secondary-type crude oil recovery process using a drive fluid to move a displacing fluid containing electrolyte and/or semipolar organic compound through a subterranean formation to displace crude oil therefrom is improved by incorporating within the front portion of the drive fluid a mobility reducing agent, electrolyte and semipolar organic compound. Preferably, the displacing fluid is a micellar dispersion containing surfactant, water, hydrocarbon, electrolyte, and/or semipolar organic compound (e.g., alcohol) and the front portion of the drive fluid is preferably a mobiltiy buffer containing aqueous medium, mobility reducing agent, electrolyte and semipolar organic compound (e.g., an alcohol).

CROSS-REFERENCE TO RELATED APPLICATIONS

This is a continuation-in-part of copending application Ser. No. 693,129, filed Dec. 26, 1967.

BACKGROUND OF THE INVENTION

Secondary-type recovery of crude oil from subterranean formations can be effected by utilizing a displacing fluid followed by a drive fluid to move the displacing fluid through the formation. In such a process, a relatively viscous zone can form at the juncture of the back portion of the displacing fluid and the front portion of the drive fluid. "Fingering" can result from this condition. Also, where the displacing fluid contains water-soluble components and the front portion of the drive fluid is aqueous, the drive fluid can "leach" or sorb these components. Thus, the displacing fluid loses characteristics imparted by such components and the efficiency of the recovery process is adversely affected.

Applicant has discovered that by incorporating into the front portion of the drive fluid semipolar organic compound and electrolyte, along with a mobility reducing agent, the overall efficiency of the recovery process can be improved.

DESCRIPTION OF THE INVENTION

The displacing fluid useful with this invention can be any fluid which effectively displaces or recovers crude oil from the formation. Examples of such fluids include miscible flooding agents comprised of semipolar organic compounds (e.g., alcohols, ketones, esters, etc.), and/or hydrocarbons (e.g., LPG), and known miscible agents; water- or oil-external emulsions and water- or oil-external micellar dispersions. The displacing fluid contains semipolar organic compound and/or electrolyte.

Preferably, the displacing fluid is a micellar dispersion. The term "micellar dispersion" as used herein is meant to include "micro-emulsions" [Schulman and Montagne, Annals of the New York Academy of Sciences, 92, pages 366-371 (1961)], oleopathic hydro-micelles, [Hoar and Schulman, Nature, 152, page 102 (1943)], "transparent" emulsions (Blair et al., United States Pat. No. 2,356,205) and micellar solutions, examples include those defined in United States Pat. Nos. 3,254,714, 3,275,075, 3,301,325, 3,307,628 and 3,330,344. Examples of micellar dispersions include those taught in United States Pat. No. 3,348,611 to Reisberg.

The micellar dispersions of this invention are preferably composed of hydrocarbon, an aqueous medium, and surfactant. Examples of hydrocarbon include crude oil, partially refined fractions thereof, e.g., side cuts from crude columns, crude column overheads, straight-run gasoline, and liquefied petroleum gases. Useful surfactants include cationic, nonionic, and anionic surface active compounds. A particularly useful surfactant is an alkyl aryl sulfonate containing monovalent cation (e.g., sodium and ammonium), more commonly known as petroleum sulfonates or as alkyl aryl naphthenic sulfonates. Examples of other useful surfactants are found in United States Pat. No. 3,254,714. The aqueous medium can be water, brackish water and brine water.

Semipolar organic compounds (also identified as cosurfactants and cosolubilizers) useful in the displacing fluids, especially the micellar dispersions, include ketones, esters, amides, and alcohols containing from one up to about 20 or more carbon atoms. Preferably, the semipolar compound is an alcohol, e.g., methanol, isopropanol, n- and isobutanol, the amyl alcohols, 1- and 2-hexanol, 1- and 2-octanol, the decyl alcohols, alkaryl alcohols, such as p-nonyl phenol, and alcoholic liquors such as fuel oil. Mixtures of two or more semi-polar organic compounds are useful.

Electrolytes useful with the displacing fluids, especially the micellar dispersions, include inorganic bases, inorganic acids, inorganic salts, organic bases, organic acids, and organic salts. Examples of useful electrolytes include those found in United States Pat. Nos. 3,297,084 and 3,330,343. Preferably, the electrolytes are inorganic acids, inorganic bases, and inorganic salts. Examples of electrolytes include sodium sulfate, sodium chloride, sodium hydroxide, hydrochloric acid, sulfuric acid, and sodium nitrate.

Preferably, the micellar dispersions contain five components, i.e., hydrocarbon, water, surfactant, electrolyte and semipolar organic compound.

The percent formation pore volume of displacing fluid useful with the process depends, inter alia, on the crude oil, formation, and type of displacing fluid. Where the displacing fluid is a micellar dispersion, 1% to more than about 20% formation pore volume is useful to displace crude oil.

The front portion of the drive fluid can effect "leaching" or "sorption" of the semipolar organic compound and/or electrolyte from the back portion of the displacing fluid when in the subterranean formation. By incorporating electrolyte and semipolar compound within the front portion of the drive fluid, this adverse phenomenon can be corrected and more efficient sweeping of the formation is realized.

The ultimate purpose of the drive fluid is to effectively move the displacing fluid through the formation to displace crude oil. The front portion acts as a mobility buffer to protect the displacing fluid from invasion by a drive water. Preferably, the drive fluid is compatible with the back portion of the displacing fluid.

Examples of drive fluids include nonpolar materials (e.g., hydrocarbons) such as LNG (liquefied natural gas), LPG (liquefied petroleum gas), etc., and polar materials such as water. The drive fluid does not include water-external emulsions. Preferably, the front portion of the drive fluid has a mobility about equal to or less than the mobility of the back portion of the displacing fluid.

The drive fluid is divided into a front portion, which is a lesser portion and is the mobility buffer portion, and a major back portion. The fluid is preferably water when the displacing fluid is a micellar dispersion. A portion of the mobility buffer portion can have graded mobilities from a low of about that of the displacing fluid to a high of about that of pure drive fluid, e.g., water or hydrocarbon drive in the major back portion.

The desired mobility is imparted to the drive fluid by incorporating mobility reducing agents in the fluid. Such agents are also known as "thickening agents" and viscosity imparting agents. Agents such as organic polymers, e.g., polyisobutylene and like polymers, are useful with nonpolar materials. Agents such as polysaccharides, carboxy methyl cellulose, glycerine, high molecular weight alcohols, and especially high molecular weight partially hydrolyzed polyacrylamides (e.g., the Pusher series marketed by Dow Chemical Co.) and like materials are useful with polar materials, e.g., water. Any polymer which imparts a decreased mobility (e.g., increases the viscosity and/or decreases the effective permeability, etc.) is useful within the drive fluid.

The semipolar organic compounds and electrolytes mentioned earlier as useful in the displacing fluid are also useful in the drive fluid. The amounts of semipolar compound and electrolyte incorporated in the front portion of the drive fluid will depend upon the particular characteristics of the micellar dispersion, the formation, the formation fluids, etc. Amounts within the range of from less than about 0.05 to about 10% and more preferably from about 0.25% to about 5.0% of the semipolar compound are effective with this invention. The electrolyte can vary from less than about 0.001% to and above about 4 weight percent but preferably is from about 0.02% up to about 1.0%. Preferably, the amounts of electrolyte and semipolar compound within the front portion of the drive fluid are at equilibrium with electrolyte and/or semipolar compound within the back portion of the displacing fluid (e.g., micellar dispersion). The concentrations of semipolar compound and electrolyte can be reduced incrementally from a high at the juncture with the displacing fluid to lesser amounts at the rear of the front portion of the drive fluid.

The size of the mobility control portion of the drive fluid can vary from about 1% to about 100% formation pore volume and preferably from about 5% to about 75%. However, this again is dependent upon the characteristics of the displacing fluid, formation, formation fluids, etc.

The following examples are presented to illustrate working embodiments of the invention. Such examples are not intended to limit the invention. Rather, it is intended that all equivalents obvious to those skilled in the art be incorporated within the scope of this invention. Percents are based on volume unless otherwise specified.

EXAMPLE I

Clean Berea sandstone cores 47.5 inches long by 2 inches in diameter having characteristics indicated in Table 2 are subjected to a vacuum, saturated with water obtained from the Henry lease in Illinois (hereinafter identified as Henry plant water and containing about 18,000 p.p.m. of dissolved salts), flooded to irreducible water saturation with crude oil obtained from the Henry lease in Illinois (a sweet black Illinois crude having a viscosity of about 7 cp. at 72° F., hereinafter identified as Henry crude oil) and then flooded with Henry plant water to residual oil saturation. Micellar dispersions having compositions outlined in Table 1 are then injected into the cores (volume percents are indicated in Table 2):

TABLE I.—MICELLAR DISPERSION COMPOSITION

| Component | Solution "A" (percent) | Solution "B" (percent) |
| --- | --- | --- |
| Crude column overhead (a heavy naphtha) | 59.16 | 59.38 |
| Ammonium petroleum sulfonate (about 81% active) | 7.76 | 7.79 |
| Isopropanol | 1.73 | 1.36 |
| p-Nonyl phenol | 0.15 | 0.15 |
| Water | 32.20 | 31.32 |
| Sodium hydroxide (weight percent) | 0.473 | 0.941 |

Thereafter, there is injected 1.2 pore volumes of thickened water (mobility buffer) containing water obtained from the Palestine water reservoir in Palestine, Ill. (contains about 450 p.p.m. of dissolved salts, hereinafter identified as Palestine water), 800 p.p.m. of No. 530 Pusher (a high molecular weight partially hydrolyzed polyacrylamide sold by Dow Chemical Company), 50 p.p.m. of ammonium thiocyanate, 800 p.p.m. isopropyl alcohol (this small amount added *only* to facilitate the solubilization of No. 530 Pusher), plus the additional alcohol (semipolar organic compound) indicated in Table 2. Table 2 contains data indicating increased crude oil recovery by incorporating the semipolar organic compound and the electroylte within the leading edge of the thickened water.

TABLE 2

| | Core characteristics | | | Micellar dispersion | | Thickened water | | Crude oil recovery | |
| --- | --- | --- | --- | --- | --- | --- | --- | --- | --- |
| Sample | Permeability (md) | Effective porosity (percent) | Residual oil saturation (percent) | Type (Table 1) | Slug size, percent PV of formation | Percent vol. alcohol | Type of alcohol | Recovery of crude in core | Percent improvement |
| a | 252 | 20.1 | 35.8 | A | 3 | | | 46.4 | 0 |
| b | 222 | 19.3 | 36.2 | A | 3 | 4 | Iso-propanol | 62.6 | 35 |
| c | 383 | 20.8 | 33.9 | A | 3 | 6 | do | 71.6 | 54 |
| d | 229 | 19.7 | 36.4 | B | 5 | | | 78.9 | 0 |
| e | 213 | 19.7 | 34.0 | B | 3 | 4 | Iso-propanol | 84.4 | 7 |
| f | 304 | 20.6 | 34.9 | B | 3 | 6 | do | 86.6 | 10 |
| g | 300 | 19.5 | 33.8 | B | 3 | 1 | i-Amyl alcohol | 91.5 | 16 |
| h | 228 | 19.3 | 35.0 | B | 3 | 1 | Amyl alcohol | 87.7 | 11 |
| i | 226 | 19.4 | 33.1 | B | 3 | 3 | i-Butanol | 92.2 | 17 |
| j | 336 | 20.2 | 35.2 | B | 3 | 3 | n-Butanol | 93.9 | 19 |

Samples b and c indicate increased oil recovery over Sample a (contains no semi-polar compound in the thickened water). Samples e–j show improved oil recovery over Sample d even though Samples e–j are based on 3% PV (formation pore volume) while Sample d is based on 5% PV.

What is claimed is:

1. A process for recovering crue oil from subterranean formations wherein displacing fluids are injected into the formation through at least one injection means to displace crude oil toward at least one production means, the process comprising injecting into the formation:
   (1) a displacing fluid selected from the group consisting of oil-external emulsions, water-external emulsions, oil-external micellar dispersions, water-external micellar dispersions and miscible-flooding agents comprised of component(s) selected from the group consisting of semipolar organic compound, electrolyte, or a combination of the semipolar compound and electrolyte, and immediately thereafter injecting
   (2) a drive fluid having a front portion comprised of semipolar organic compound, electrolyte, and mobility reducing agent and moving the displacing fluid and drive fluid toward at least one production means and recovering crude oil through said production means.

2. The process of claim 1 wherein the displacing fluid is a micellar dispersion.

3. The process of claim 2 wherein 1% to about 20% formation pore volume of the micellar dispersion is injected into the formation.

4. The process of claim 1 wherein the front portion of the drive fluid has a mobility about equal to or less than the mobility of the displacing fluid.

5. The process of claim 1 wherein the drive fluid is substantially aqueous.

6. The process of claim 1 wherein the component(s) within the back portion of the displacing fluid are substantially at equilibrium with the respective component(s) within the front portion of the drive fluid.

7. A process for recovering crude oil from subterranean formations wherein displacing fluids are injected into the formation through at least one injection means to displace the crude oil toward at least one production means, the process comprising injecting into the formation:
   (1) a micellar dispersion comprised of component(s) selected from the group consisting of electrolyte, semipolar organic compound, or a combination of the electrolyte and semipolar organic compound, and immediately thereafter injecting
   (2) a mobility buffer characterized in that the front portion of the buffer is comprised of electrolyte, semipolar organic compound, and mobility reducing agent, and then injecting
   (3) a water drive in amounts sufficient to displace the micellar dispersion and the mobility buffer toward at least one production means and recovering crude oil through said production means.

8. The process of claim 7 wherein the component(s) within the back portion of the micellar dispersion and the respective components within the front portion of the mobility buffer are substantially at equilibrium within the formation.

9. The process of claim 7 wherein the front portion of the mobility buffer has a mobility about equal to or less than the mobility of the back portion of the micellar dispersion.

10. The process of claim 9 wherein a portion of the mobility buffer has graded mobilities from a low of the micellar dispersion to a high of the water drive.

References Cited

UNITED STATES PATENTS

| | | | |
|---|---|---|---|
| 3,261,399 | 7/1966 | Coppel | 166—273 |
| 3,266,570 | 8/1966 | Gogarty | 166—273 |
| 3,330,345 | 7/1967 | Henderson et al. | 166—273 |
| 3,348,611 | 10/1967 | Reisberg | 166—274 X |
| 3,366,174 | 1/1968 | Ferrell et al. | 166—273 |
| 3,373,809 | 3/1968 | Cooke | 166—273 |
| 3,376,925 | 4/1968 | Coppel | 166—274 |
| 3,406,754 | 10/1968 | Gogarty | 166—273 |
| 3,455,385 | 7/1969 | Gogarty | 166—274 |

STEPHEN J. NOVOSAD, Primary Examiner

UNITED STATES PATENT OFFICE
CERTIFICATE OF CORRECTION

Patent No. 3,520,365        Dated July 14, 1970

Inventor(s)  Stanley C. Jones

It is certified that error appears in the above-identified patent and that said Letters Patent are hereby corrected as shown below:

| | |
|---|---|
| Column 2, line 28: | Delete "fuel" and insert --fusel--. |
| Table I, Column 4, under "Solution 'A'": | Delete "32.20" and insert --31.20--. |
| Column 4, line 31: | Delete "electroylte" and insert --electrolyte--. |
| Column 4, line 48: | Delete "crue" and insert --crude--. |
| Column 5, line 20: | Delete "mobility," and insert --mobility--. |

SIGNED AND
SEALED
OCT 20 1970

(SEAL)
Attest:

Edward M. Fletcher, Jr.
Attesting Officer

WILLIAM E. SCHUYLER, JR.
Commissioner of Patents